United States Patent Office 3,532,775
Patented Oct. 6, 1970

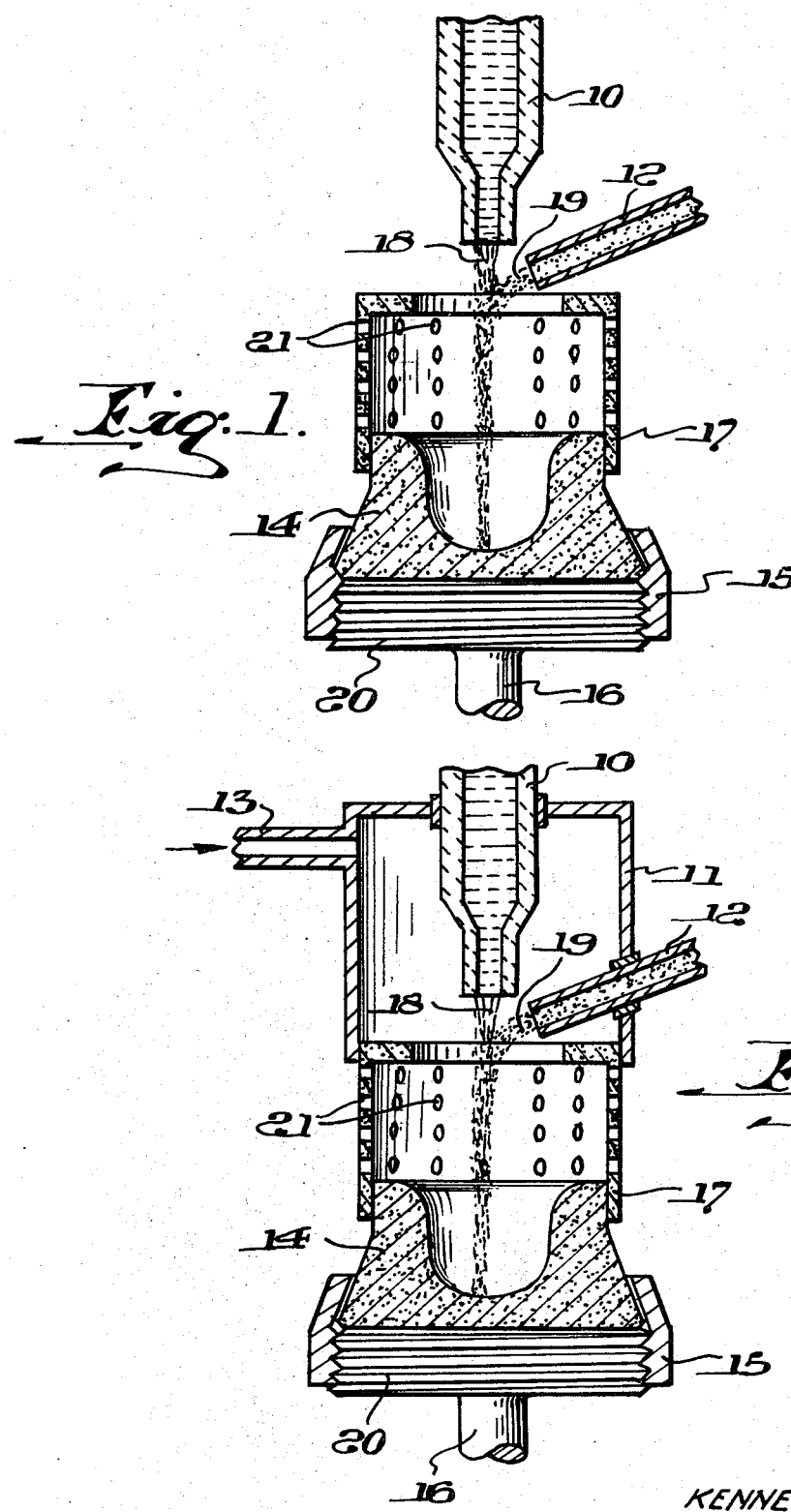

3,532,775
METHOD FOR PRODUCING ALUMINUM PARTICLES
Kenneth J. Brondyke, Oakmont, and Ronald Bachowski, Monroeville, Pa., assignors to Aluminum Company of America, Pittsburgh, Pa., a corporation of Pennsylvania
Continuation of application Ser. No. 581,239, Sept. 22, 1966. This application Apr. 10, 1969, Ser. No. 816,175
Int. Cl. B22d 23/08; B23c 23/00
U.S. Cl. 264—7                                              4 Claims

ABSTRACT OF THE DISCLOSURE

Spherical aluminum particles can be produced by mixing molten aluminum and an aluminum-oxide-dissolving flux, subdividing the resultant mixture into discrete droplets, and discharging the droplets through the atmosphere to cool and solidify them. The mixture can be subdivided and dispersed by passing the mixture through a pneumatic atomizing nozzle or by dropping the mixture upon an upwardly concave surface which is rotating about a vertical axis.

---

This is a continuation of application Ser. No. 581,239, filed Sept. 22, 1966, and now abandoned.

This invention relates to an improved method for producing aluminum particles, and more particularly to a method of subdividing molten aluminum to produce spherical aluminum particles. "Aluminum" as used herein embraces both aluminum of various grades of purity and aluminum base alloys.

In some of the uses of aluminum particles, such as their use in some chemical and metallurgical processes, it is desirable that the particles be as nearly spherical as possible. For such uses the spherical particles exhibit the desirable qualities over irregular shaped particles of having a greater bulk density, being more incompressible and being more easily handled. However, in the production of aluminum particles by the methods heretofore known, the particles have been irregular in shape and, therefore, somewhat less than ideal for these and similar uses.

Accordingly, it is an object of the invention to provide an improved method of producing spherical aluminum particles.

Another object of the invention is to provide an economical method of producing spherical aluminum particles, particularly a continuous method for producing such particles.

As is well known, molten aluminum has considerable surface tension which when acting on an undisturbed molten aluminum droplet will tend to form the droplet into a spherical shape. Nevertheless, particles formed from molten aluminum by the long known vibrating, perforated trough method, the rotating disc or cup method, and the pneumatic atomization method have been somewhat irregular in shape. It is believed that in these methods the irregularities are caused by the rapid formation of an envelope of tenacious aluminum oxide over the molten droplet prior to its solidification. This aluminum oxide film restricts the natural forces of surface tension which would otherwise tend to cause the droplets to become spherical.

We have discovered a method of producing aluminum droplets that are protected from the excessive formation of aluminum oxide and that form solidified particles that are nearly perfect spheres. Our invention comprises introducing molten aluminum and an aluminum-oxide-dissolving flux simultaneously into a common environment so that the two substances are mixed, and then subdividing the resultant mixture and discharging the mixture through the atmosphere in the form of discrete droplets. The flux forms a protective coating over the droplets as they are dispersed, and acts to greatly impede formation of aluminum oxide over the surface of the molten droplets. The forces of surface tension on the molten aluminum are, therefore, not effectively restricted by the formation of aluminum oxide, and each droplet will naturally assume a spherical shape. The spherical droplets are then solidified while in uninterrupted flight through the atmosphere to produce spherical particles. The particles are collected and can be washed in warm or hot water to remove the congealed flux if so desired.

The method of the invention can be practiced in a variety of ways, as by use of apparatus such as that shown in the drawings.

FIG. 1 is a sectional elevation of a preferred embodiment of rotating cup apparatus that may be employed in the practice of the invention;

FIG. 2 is a sectional elevation view of a modification of the apparatus shown in FIG. 1;

Figure 3:
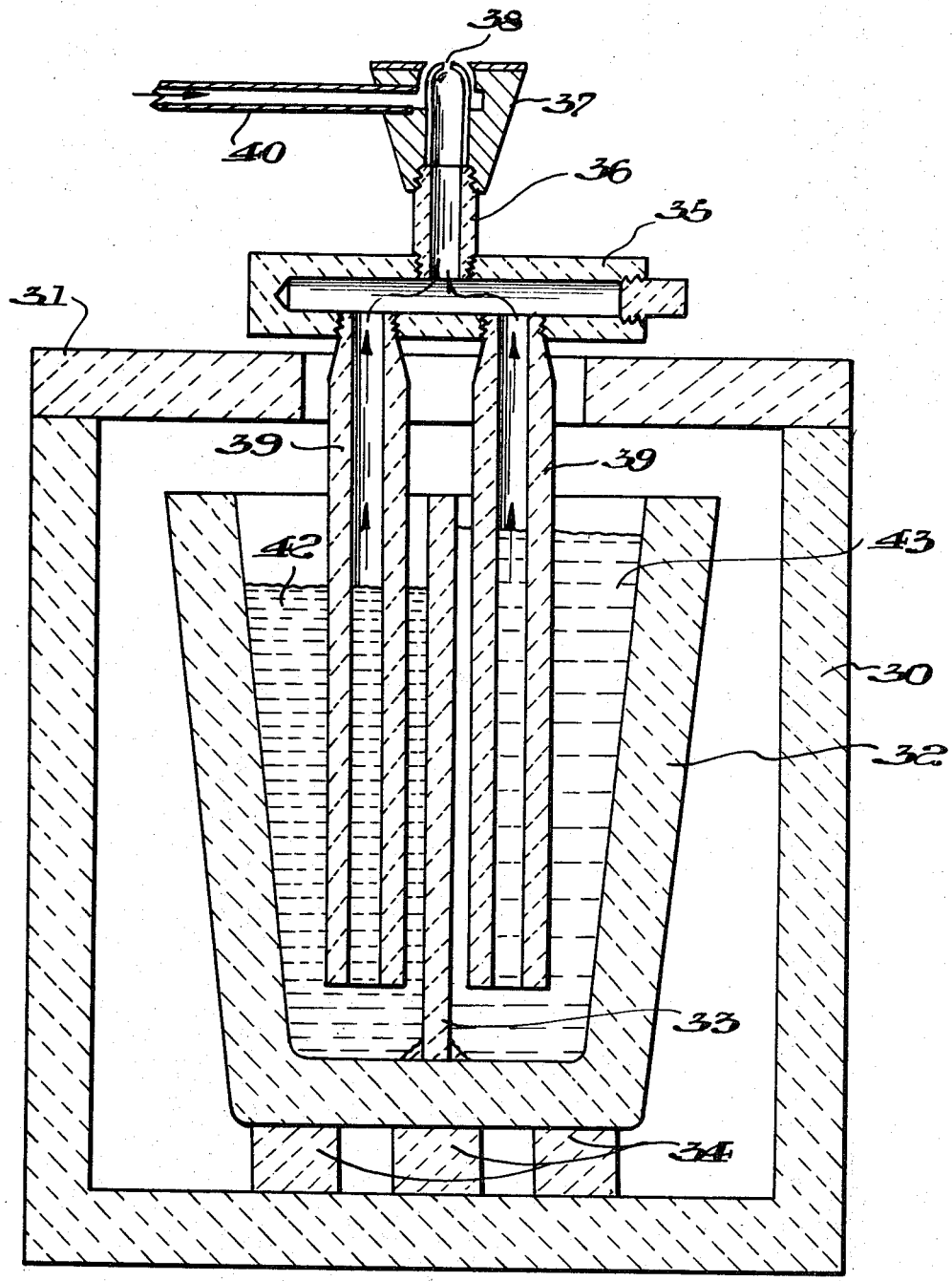
FIG. 3 is a sectional elevation of a pneumatic atomizing apparatus that may be employed in the practice of the invention.

Referring to FIG. 1, a preferred embodiment of centrifugal type apparatus for making spherical aluminum particles is shown as including a rotatable cup 14 mounted on a rotatable vertical shaft 16, the cup being connected by a collar 15 to the base 20 on the upper end of the shaft. Above the cup is a metal discharge spout 10, a flux feeder tube 12, and a cowl 17. Also needed for practice of the process with this equipment, but not shown, are a molten aluminum supply, a flux supply, and means for rotating the vertical shaft 16 and cup 14 secured thereto.

As shown, the cup 14 has an upwardly concave surface that gives it a tulip-like appearance. The collar 15 secures the cup 14 to the integral base 20 on vertical shaft 16, making the cup 144 rotatable with the shaft 16. The cowl 17 is also rotatable with the cup 14 and shaft 16 as it is secured to the outer periphery of the cup 14. This cowl 17 has an opening in its top through which the molten aluminum is poured and a multiplicity of uniform sized holes 21 around its periphery that function to help form the molten aluminum into uniform sized droplets.

In the operation of this apparatus in accordance with our invention, molten aluminum is allowed to fall vertically in a thin, uniform stream 18 from the spout 10 onto the upwardly concave surface of the cup 14 which is rotating about a substantially vertical axis. Simultaneously with this, a stream 19 of an aluminum-oxide-dissolving flux, either as a dry powder or in the molten state, is continuously introduced onto the upwardly concave surface so that a major portion of molten aluminum and a minor portion of flux are mixed. Since molten flux is difficult to handle, it is preferable to use a dry powdered flux. The heat of the molten aluminum melts the dry powdered flux as the two substances are mixed. In the preferred practice of our invention, using the dry powdered flux, the discharge end of the flux feeder tube 12 may be water cooled to prevent the dry flux from being partially melted at the end of the flux feeder tube 12 and causing it to plug the tube orifice.

When the molten aluminum and flux strike the surface of the rotating cup 14, centrifugal force is imparted from the cup 14 to the aluminum and flux. This centrifugal force mixes the two materials and throws the resultant mixture outwardly, up the sides of the cup, against the cowl 17, and out through the multiplicity of holes 21 in the cowl 17. As discharged through holes 21, the aluminum is subdivided into discrete droplets with the melted flux forming a thin coating thereon. Since the droplets are protected from oxidation by the flux coating, the surface tension of the aluminum will have sufficient time to naturally form the droplet into a spherical configuration before it solidifies.

The droplets are cooled while in uninterrupted flight through the atmosphere, thereby solidifying to produce nearly perfect spherical particles. These spherical particles are then collected and, if need be, they may be washed in warm or hot water to remove the congealed coating of flux.

The cup 14 and cowl 17 may be constructed of any material that has a higher melting point than aluminum, such as carbon steel, cast iron, or oxidation-resistant graphite, with the latter material being preferred because of its resistance to solution attack by the molten aluminum and flux.

The aluminum-oxide-dissolving flux may be selected from the salt fluxes that are commonly used in aluminum metallurgical processes and include, among others, alkali metal halide salt fluxes such as those comprised of sodium chloride, potassium chloride and aluminum fluoride or cryolite, or the like. The flux preferably has a melting point somewhat below the melting point of aluminum so that the super heat of the molten aluminum will melt the flux as they mix, and so that the aluminum will tend to solidify first. The desired ratio of flux to aluminum varies depending on the purity of the aluminum being atomized, with the less pure alloys generally requiring more flux. Ratios as low as 0.005 pound of flux, but often about 0.05 pound or somewhat more, per pound of molten aluminum have been found to produce quite satisfactory results with little if any flux waste, but even smaller or larger amounts of flux may be used so long as the flux is the minor component of the mixture.

Although not essential, the preferred practice of our invention includes maintaining an inert atmosphere over the surface of the rotating cup 14. This inert atmosphere is salutary to continuous operation of the apparatus, as it greatly reduces the buildup of aluminum-oxide sludge in the cowl 17. As shown in FIG. 2, the necessary structure for this modification includes a gas hood 11 which communicates with a source of inert gas, not shown, through gas duct 13. The inert gas, such as nitrogen or argon from the supply, is introduced into the hood 11 and cowl 17 to flush the oxidizing atmosphere normally contained therein, out through the holes 21 and through the clearance between the hood 11 and cowl 17. The inert gas thus replaces the oxidizing atmosphere, and the main cause of the buildup of a sludge of aluminum oxide on the inner surface of the cowl 17 is removed. This reduces the frequency of shutdown for removal of the sludge deposits. Since the inert gas will continuously escape from between the hood 11 and cowl 17 at the junction thereof, and through the holes 21, a constant supply of the inert gas is added to maintain the desired atmosphere.

Turning to FIG. 3, a preferred embodiment of a pneumatic type of atomizing apparatus is shown, comprising a furnace 30 with a cover 31 thereon, a crucible 32 disposed centrally in the furnace on a plurality of bricks 34, a vertical divider plate 33, extension tubes 39 for the flux and molten aluminum, an adapter block 35, a coupling tube 36, a pneumatic atomizing nozzle 37, and an air duct 40. Also required for the continuous operation of this apparatus, but not shown in the drawings, are a molten aluminum source and lead-in, a flux source and lead-in, an air supply, and a heating means for maintaining the furnace at a temperature above the melting point of aluminum.

As shown in FIG. 3 a body of molten aluminum 43 and a body of molten aluminum-oxide-dissolving flux 42 are maintained in the holding crucible 32. The extension tubes 39 are suspended in these bodies with their discharge ends opening into an adapter block 35 common to both tubes. The adapter block 35 communicates with a pneumatic-atomizing nozzle 37 of standard design through coupling tube 36. The extension tubes 39, adapter block 35, and coupling tube 36 are all constructed of graphite to resist attack by the molten aluminum and flux. The nozzle 37 may be made of cast iron or carbon steel among other materials.

In the operation of this apparatus, air or an inert gas from a supply not shown is jetted from duct 40 across orifice 38 in the nozzle 37. The air jetting across the orifice 38 produces a vacuum in the nozzle 37, and the atmospheric pressure acting on the surfaces of the molten aluminum 43 and flux 42 will simultaneously force these materials up the extension tubes 39, through the adapter block 35 and coupling tube 36, and into the nozzle 37 so that the molten aluminum and flux are mixed. The resulting mixture is subdivided and discharged through the atmosphere in the form of discrete droplets by pneumatically spraying the mixture through orifice 38 of the nozzle 37. As sprayed from the nozzle 37, each discrete droplet of aluminum will have a coating of flux thereon inhibiting the formation of an aluminum oxide envelope. Consequently, the natural surface tension of the molten aluminum will cause the droplet to form a nearly perfect sphere. As in the rotating cup method, the droplets of aluminum are cooled while in uninterrupted flight through the atmosphere and thereby solidify into spherical particles. The frozen particles may then be collected and washed, if desired, to remove the congealed flux coating on them.

The flux used in this apparatus may be the same type salt flux as in the rotating cup apparatus, and the desired ratio of flux to the molten aluminum to the flux is approximately the same in both types of apparatus. The control of the ratio of flux to aluminum used in the pneumatic atomizer may be effected by several methods well know to those skilled in the art. Among these are regulating the surface level of the two materials or using different diameter bores in the extension tubes in the two materials.

The following examples will illustrate the nature of the present invention, but are not intended to limit the invention in any way.

EXAMPLE I

Molten aluminum alloy consisting of essentially commercially pure aluminum at a temperature of approximately 1500° F. and a dry powder flux mixtue of 45% NaCl, 50% KCl and 5% cryolite were simultaneously poured onto the surface of a rotating cup of the type shown in FIG. 1. In various runs, a 3½ inch diameter cup was rotated at speeds of 1400 to 300 r.p.m. The molten aluminum was poured into the cup at the rate of approximately 1300 pounds per hour. Approximately 0.007 pound of the flux mixture was added per pound of aluminum. The holes in the cowl were 1/16 inch in diameter.

Operation of the process without an inert gas atmosphere produced nearly perfect spherical particles ranging from 0.005 to 0.065 inch in diameter.

EXAMPLE II

The apparatus was operated the same as in Example I except that 55 c.f.m. of argon was introduced into a hood as shown in FIG. 2. This operation produced nearly perfect spherical particles of the same size, and the operation of the apparatus continued for an extended time with no buildup of sludge.

EXAMPLE III

Molten aluminum alloy consisting of essentially commercially pure aluminum at a temperature of approximately 1500° F. and molten flux of 50% KCl, 45% NaCl and 5% cryolite were pneumatically atomized through apparatus of the type shown in FIG. 3. The holding crucible was filled with the two materials at the start of the run and were allowed to run without replenishing. The amounts of flux and aluminum being atomized at any given time varied as the respective levels of the flux and aluminum were lowered. Microscopic examination of the resulting powder showed that the particles were spherical, and particle diameters varied between 5 and 90 microns, with the larger diameter particles being produced when the ratio of flux to aluminum was at the higher percentages.

While the invention has been described, and several practices for the employment thereof have been set forth, it will be obvious to those skilled in the art that many modifications of the invention are possible without departing from the scope thereof.

What is claimed is:
1. The improved method of producing spherical aluminum particles comprising the steps of:
  (a) introducing molten aluminum and an aluminum-oxide-dissolving flux having a melting point below the melting point of aluminum simultaneously into a common environment so that the molten aluminum and flux are mixed;
  (b) subdividing the resultant mixture of molten aluminum and flux and discharging the same through the atmosphere in the form of discrete droplets of molten aluminum having protective coatings of aluminum-oxide-dissolving flux substantially thereover; and
  (c) solidifying the discharged droplets while in uninterrupted flight through the atmosphere to produce spherical particles.
2. The improved method of producing spherical aluminum particles comprising the steps of:
  (a) introducing molten aluminum and an aluminum-oxide-dissolving flux having a melting point below the melting point of aluminum simultaneously onto an upwardly concave surface which is rotating about a substantially vertical axis so that the molten aluminum and flux are mixed;
  (b) subdividing the resultant mixture of molten aluminum and flux and discharging the same through the atmosphere in the form of discrete droplets of molten aluminum having protective coatings of aluminum-oxide-dissolving flux substantially thereover by centrifugally throwing the mixture from said surface; and
  (c) solidifying the thrown droplets while in uninterrupted flight through the atmosphere to produce spherical particles.
3. The method set forth in claim 2 wherein an atmosphere of inert gas is maintained over the rotating surface.
4. The improved method of producing spherical aluminum particles comprising the steps of:
  (a) introducing molten aluminum and an aluminum-oxide-dissolving flux having a melting point below the melting point of aluminum simultaneously onto a pneumatic atomizing nozzle so that the molten aluminum and flux are mixed;
  (b) subdividing the resultant mixture of molten aluminum and flux and discharging the same through the atmosphere in the form of discrete droplets of molten aluminum having protective coatings of aluminum-oxide-dissolving flux substantially thereover by pneumatically spraying the mixture from said nozzle; and
  (c) solidifying the sprayed droplets while in uninterrupted flight through the atmosphere to produce spherical particles.

References Cited
UNITED STATES PATENTS

| | | | |
|---|---|---|---|
| 2,371,105 | 3/1945 | Lepsoe | 264—7 |
| 2,728,107 | 12/1955 | Hershey | 264—8 |
| 2,909,808 | 10/1959 | Frehn | 264—12 |

OTHER REFERENCES

A.P.C., application of Erich Kaufmann, Ser. No. 268,381, published July 13, 1943.

ROBERT F. WHITE, Primary Examiner

R. R. KUCIA, Assistant Examiner

U.S. Cl. X.R.
264—8, 12